(12) United States Patent
Privan (10) Patent No.: US 7,910,036 B2
(45) Date of Patent: Mar. 22, 2011

(54) METHOD OF MOLDING OBJECT OF INDEFINITE LENGTH USING AN INJECTION MOLD APPARATUS

(75) Inventor: Michael Privan, Lavington (AU)

(73) Assignee: Continuous Moulding Technologies Pty Ltd. (AU)

( * ) Notice: Subject to any disclaimer, the term of this patent is extended or adjusted under 35 U.S.C. 154(b) by 0 days.

(21) Appl. No.: 12/671,150

(22) PCT Filed: Jul. 8, 2008

(86) PCT No.: PCT/AU2008/000981
§ 371 (c)(1),
(2), (4) Date: Mar. 4, 2010

(87) PCT Pub. No.: WO2009/015411
PCT Pub. Date: Feb. 5, 2009

(65) Prior Publication Data
US 2010/0193990 A1 Aug. 5, 2010

(30) Foreign Application Priority Data
Jul. 29, 2007 (AU) ................................ 2007904039

(51) Int. Cl.
*B29C 45/03* (2006.01)
*B29C 39/14* (2006.01)
(52) U.S. Cl. ................. 264/294; 264/328.7; 264/328.11
(58) Field of Classification Search ................... 264/165, 264/328.8, 328.7, 328.11, 308, 294
See application file for complete search history.

(56) References Cited

U.S. PATENT DOCUMENTS

| | | | | |
|---|---|---|---|---|
| 2,969,563 A | * | 1/1961 | Hendry | 264/328.7 |
| 3,992,503 A | * | 11/1976 | Henfrey et al. | 264/167 |
| 4,008,302 A | | 2/1977 | Erlichman | |
| 4,321,227 A | * | 3/1982 | Henfrey et al. | 264/167 |
| 4,445,836 A | | 5/1984 | Dawson | |
| 4,586,607 A | | 5/1986 | Dubbs et al. | |
| 4,946,639 A | * | 8/1990 | Majerus et al. | 264/308 |

(Continued)

FOREIGN PATENT DOCUMENTS
GB 2080726 A 10/1982
(Continued)

OTHER PUBLICATIONS

PCT/AU2008/00981, Feb. 11, 2010, Intlnatl. Prelim. Report on Patenability.

*Primary Examiner* — Jill L Heitbrink
(74) *Attorney, Agent, or Firm* — Ballard Spahr LLP (57) ABSTRACT

A method of moulding an object of indefinite length. A first portion of molten material is injected into a mould comprising a stationary platen and a moving platen and solidifies to form a first portion of solid material at a first position. The moving platen is moved in a given direction to open the mould and move the material in said given direction to a second position in communication with the mould. The moving platen is then moved in the opposite direction to close the mould. A further portion of molten material is injected into the mould and solidifies to form a further portion of solid material intimately bonded to said first portion. The steps are repeated to form an object comprising the first portion and further portions of material bonded together as a linear array of indefinite length.

32 Claims, 10 Drawing Sheets

U.S. PATENT DOCUMENTS

| | | | |
|---|---|---|---|
| 4,961,895 A | 10/1990 | Klein | |
| 5,725,392 A | 3/1998 | Bianca et al. | |
| 5,788,901 A * | 8/1998 | Barnard et al. | 264/165 |
| 6,146,199 A * | 11/2000 | Ortega et al. | 439/590 |
| 6,379,600 B1 * | 4/2002 | Sanders | 264/250 |
| 6,790,399 B2 * | 9/2004 | Fujii | 264/254 |

FOREIGN PATENT DOCUMENTS

| | | |
|---|---|---|
| JP | 55-091641 | 7/1980 |
| JP | 55091641 | 7/1980 |
| WO | WO 2009/015411 A1 | 5/2009 |

* cited by examiner

METHOD OF MOLDING OBJECT OF INDEFINITE LENGTH USING AN INJECTION MOLD APPARATUS

FIELD OF THE INVENTION

This invention concerns the use of a moulding process which can produce objects of indefinite length without many of the limitations or high cost aspects of existing processes for extrusion of plastics materials or continuous casting of metals, which are the conventional processes for producing moulded objects of indefinite length.

It is particularly suitable for the moulding of tubular products such as pipes from plastics materials. It is particularly adapted for moulding products from recycled plastics materials and other plastics materials which are difficult to mould by an extrusion process.

BACKGROUND OF THE INVENTION

Injection moulding processes for plastics materials have been developed to manufacture items of fixed given dimensions dictated by the size of the mould involved. To injection mould items which have large dimensions, large moulds are required and this entails a substantial cost both in the cost of the mould itself and of the size of the machine required to inject the required amounts of molten plastics material at the required pressures.

Over-moulding processes have been developed whereby features made of a second material are injection moulded directly onto the surface of a component previously injection moulded in a first material but, again, the size of these over-mouldings is constrained by the size of the dies and the plastics injecting equipment used to produce them.

Plastics items of indefinite length can be moulded by extrusion processes. In these processes molten material is extruded from an orifice and is then quickly cooled external of the orifice to form the solid product. Extrusion processes are generally constrained to producing products of constant cross section. Although sophisticated systems have been developed which utilise moving components in or around the orifice whereby a variation in the cross section may be produced in the course of the extrusion, these systems require very high cost dies and control systems.

Extrusion processes, when compared with injection moulding processes, generally require more sophisticated machinery with a higher degree of control over temperatures and production rate. Extrusions also generally require a narrower tolerance of physical properties, and a higher degree of uniformity of the plastic feed material being used, so extrusion processes are therefore generally not suitable for use with recycled plastics materials which can vary in properties quite significantly.

Some virgin plastics materials, such as PET, are not particularly suited for extrusion because their rheological properties during the process are so greatly dependent on the temperature that the necessary temperature control has proven to be almost impossible in an industrial manufacturing environment.

There is a need for a process which provides the abilities of extrusion processes to make products of indefinite length but also provides the simplicity, ruggedness, low cost, simple control, and tolerance to varying feed materials that is provided by injection moulding processes.

An aim of the present invention is to provide a moulding process which addresses these difficulties.

SUMMARY OF THE INVENTION

Accordingly, in one aspect the invention provides a method of moulding an object of indefinite length, said method comprising the steps of:

(i) injecting a first portion of molten material into a mould comprising a stationary platen and a moving platen and allowing said material to solidify to form a first portion of solid material at a first position;

(ii) moving said moving platen in a given direction relative to said stationary platen to open the mould and move said first portion of solid material in said given direction from said first position to a second position, whereby, in said second position, the first portion of solid material is in communication with the mould;

(iii) moving said moving platen relative to said stationary platen in the direction opposite to said given direction to close the mould with said first portion of solid material in communication with the mould;

(iv) injecting a further portion of molten material into the mould and allowing said further portion to solidify to form a further portion of solid material intimately bonded to said first portion of solid material;

(v) moving said further portion of material to said second position whereby in said second position the further portion is in communication with the mould and remains bonded to said first portion; and (vi) repeating steps (iii) to (v) so as to form an object comprising said first portion and said further portions of material bonded together as a linear array of indefinite length.

Preferably the linear array passes through the moving platen. Preferably the moulding process is a single-cavity moulding process. Preferably the object being moulded is tubular with its axis aligned with said given direction.

In some embodiments the invention provides a continuous through-platen stack moulding/mould-over process.

BRIEF DESCRIPTION OF THE DRAWINGS

In order that the invention may be more fully understood there will now be described, by way of example only, preferred embodiments and other elements of the invention with reference to the accompanying illustrations where.

With respect to illustrations of different embodiments of the invention, features which have equivalent function in each embodiment are identified by numerals which are one hundred or multiple hundreds different from the numerals identifying equivalent feature in other embodiments.

DESCRIPTION OF THE PREFERRED EMBODIMENT AND OTHER EXAMPLES OF THE INVENTION

Figure 1:
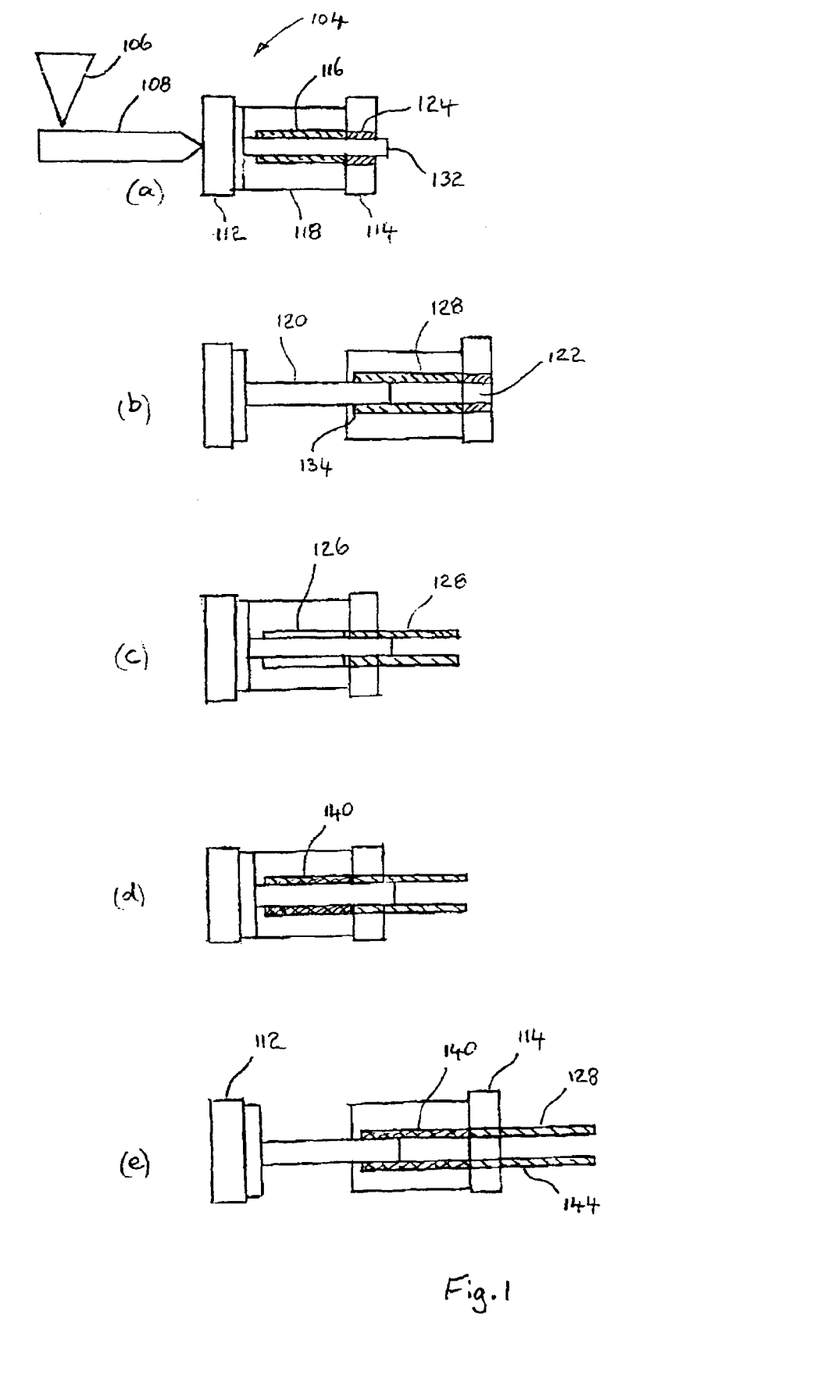
FIG. 1 diagrammatically illustrates the steps in a process according to a first embodiment of the present invention.

The embodiment illustrated in FIG. 1 relates to the manufacture of rigid pipe. A plastics injection moulding apparatus 104 includes a hopper 106 which feeds raw plastic pellets to an injection unit 108, comprising a barrel and screw, which injects molten plastic material through a stationary platen 112 into a mould cavity 116 formed in a die 118 which is affixed to a moving platen 114. A core 120 is affixed to the stationary platen.

The process in FIG. 1 is used to manufacture cylindrical pipe of an indefinite length. The cavity 116 is cylindrical and the core 120 is cylindrical. The moving platen 114 has a circular aperture 122 the diameter of which continues the cylindrical wall of the cavity 116.

In step 1(a) the core 120 is seen to extend from the stationary platen 112 centrally through the cavity 116 and then centrally through the aperture 122 to extend beyond the moving platen 114. A tubular starting blank 124 having the same internal and external of identical diameters as the pipe being moulded is held within the aperture 122 and molten plastic is injected into the cavity from the pump 108.

The plastic in the cavity 116 is then allowed to solidify and so form a first moulded portion 128 within the cavity. The first moulded portion 128 is bonded to the starting blank 124.

For the next step in the process, the moving platen 114 and its attached die 118 are moved to the right as illustrated by step 1(b). As they do so, it strips the first moulded portion 128 along the core. But the free end 132 of the core 120 remains within that end 134 of the first moulded portion which is closest to the stationary platen. As the moulded material cools further, it shrinks onto the core 120.

The moving platen 114 is then closed by moving it to the left as shown in FIG. 1(c) leaving the first section of pipe attached to the free end 132 of the core. When the platen is closed the first piece of pipe 128 creates a plug which seals the cavity.

A second portion 140 of molten plastic is then injected into the cavity as shown in FIG. 1(d) and allowed to cool. The front end of the second portion intimately bonds by welding to the rear end of the first moulding. As shown in FIG. 1(e), the moving platen 114 opens and strips the second moulding 140 along the core.

The process then continues by repetition of the steps described above with reference to FIGS. 1(d) and 1(e).

By increasing the injection shot size to be larger than the cavity size, and increasing the injection pressure to be greater than the plug resistance, the plug may be caused to slip during the injection process with a consequent increase in the volume capacity of each cycle of the process.

Figure 2:
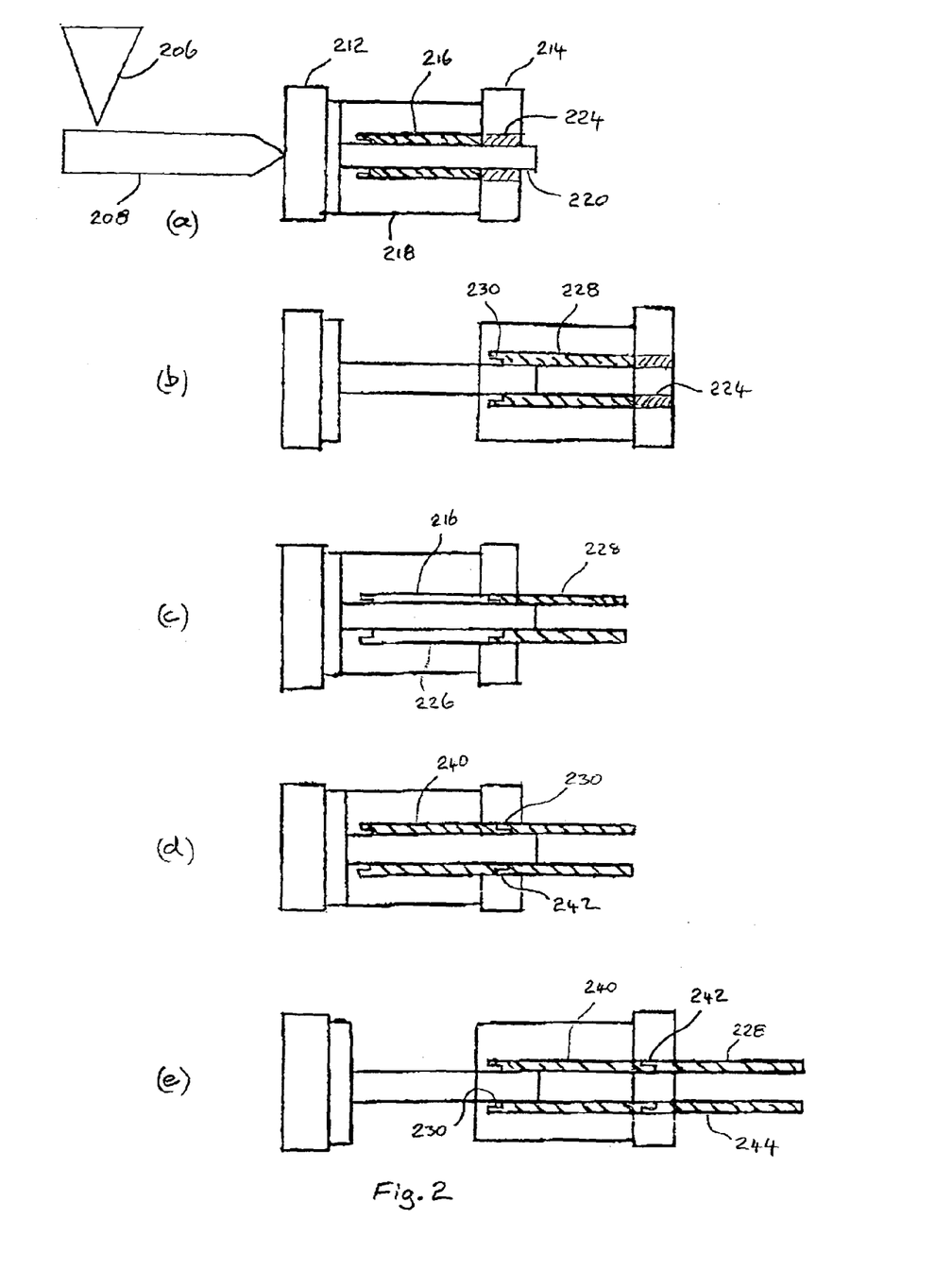
FIG. 2 diagrammatically illustrates the steps in a process according to a second embodiment of the present invention.

The second embodiment of the invention, as shown in FIG. 2, also produces a cylindrical pipe 244 of indefinite length. The bonds between the successively moulded portions 228 and 240 are significantly improved, leading to improved overall strength of the pipe product. The die 218 is shaped so the mould cavity 216 has an annular step 230 therein. The process according to the second embodiment proceeds generally the same as that described for the first embodiment with the additional feature that the second moulded portion 240 intimately bonds by welding to the first moulded portion 228 where the bonding extends over the lapped join created by the annular step 230 between the moulded portions.

FIG. 2 illustrates a modified form of the process shown in FIG. 1 whereby the strength of the product may be increased. Successive moulded portions 228 and 240 of plastic are bonded together such that portion of each moulding is caused to overlay (in a stepped manner) portion of the moulding from the previous cycle in the process to produce a lapped joint 242. Since for any given injection moulding machine, the length of that overlap constitutes a reduction in the length of the moulding that can be added with each cycle, the productivity of the process is dependent on the length of the stroke of the moving platen 214. Thus the length of the stepped overlap is preferably limited to only that amount that provides the required improvement in strength.

Figure 3:
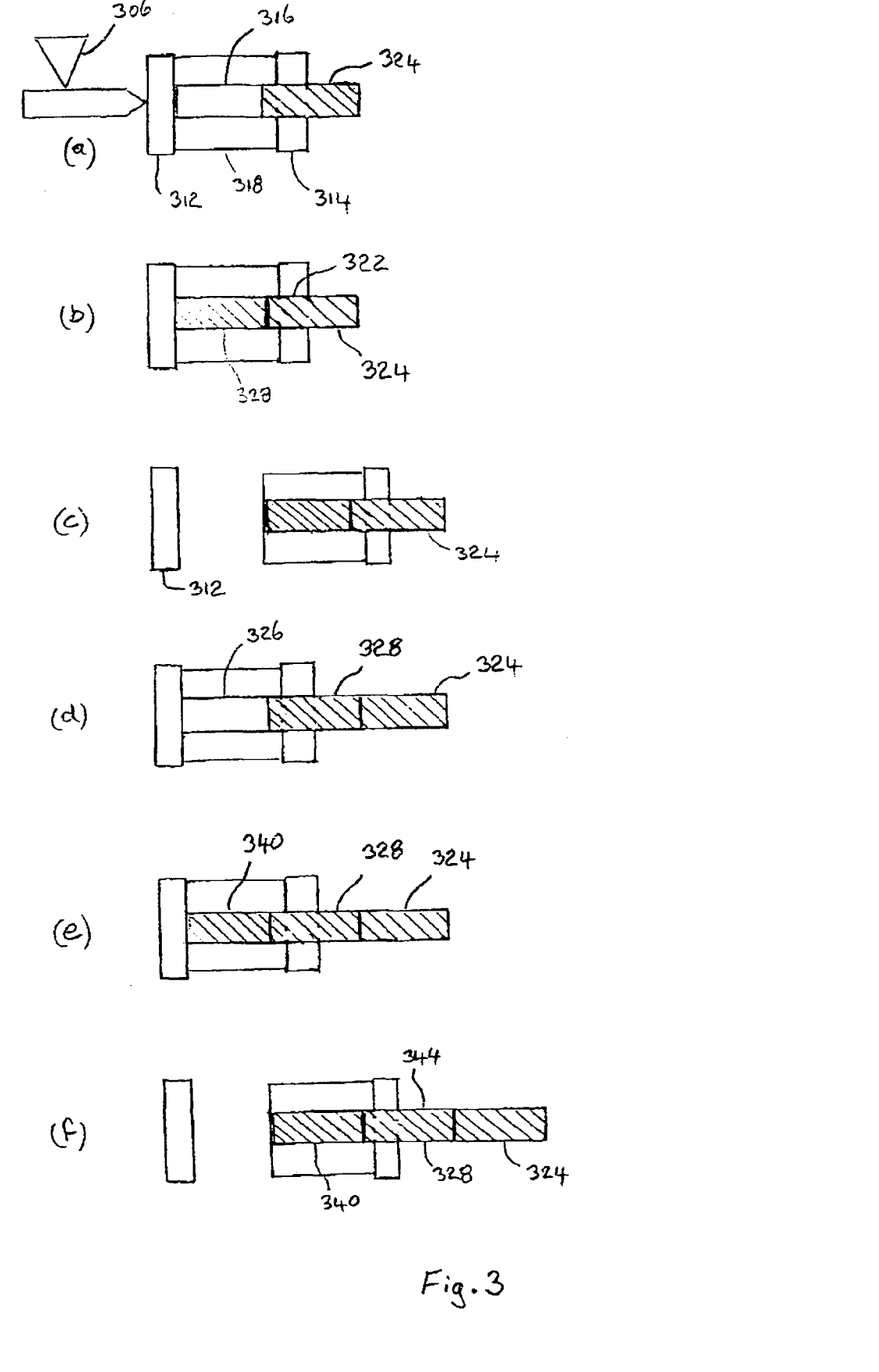
FIG. 3 diagrammatically illustrates the steps in a process according to a third embodiment of the present invention.

In the third embodiment, illustrated in FIG. 3, the process is producing a flat strip 344. The die 318 encompassing the initial mould cavity 316 is attached to the moving platen 314. With the die closed, a plug or starting blank 324 is placed in the aperture 322 to seal it as shown in FIG. 3(a). The first moulded portion 328 is moulded as shown in FIG. 3(b). As the moving platen 314 opens as seen in FIG. 3(c), the first moulded portion 328 is moved away from the stationary platen 312. When the moving platen reaches its maximum opening, the first-moulded portion 328 of strip is clamped by a clamp not shown in the illustrations, the platen 314 is then closed by moving to the left as seen in FIG. 3(d), leaving the first moulded portion 328 behind to leave the cavity 326 in the die 318 empty and the moulded portion 328 as a plug in the aperture 322 at the end of the die. As shown in FIG. 3(e), a second portion 340 of molten plastic is injected into the die to fill the die and as it solidifies it bonds intimately with the end of the first moulded portion 328 which forms part of the wall of the cavity. The moving platen then opens, as shown in FIG. 3(f), the product is clamped, the moving platen closes and the cycle repeats.

Figure 4:
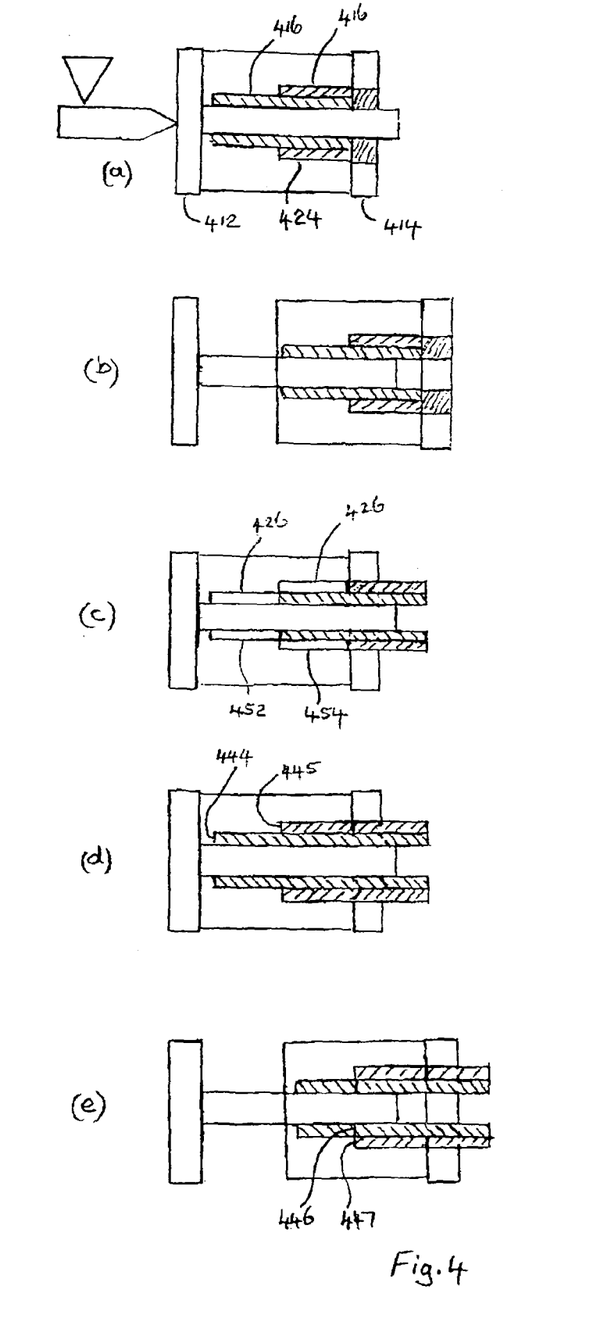
FIG. 4 diagrammatically illustrates the steps in a process according to a fourth embodiment of the present invention.

FIG. 4, illustrating the fourth embodiment, shows a use of the process to manufacture a multi-layered product. The moulding cavity 416 is in the form of a stepped cylinder having a continuous inner annular portion 452, which extends for most of the length of the cavity 416, and an external annular portion 454 which extends only part of the distance from the moving platen 414 towards the stationary platen 412 as seen in FIG. 3.

Alter starting with an appropriate starting blank 424, the general operation is as described with reference to the first embodiment except that two concentric pipes 444 and 445 intimately bonded together are moulded at the same time. One type of plastic is injected to form the outer annulus 445 and a different type of plastic is injected to form the inner annulus 444. The two different plastics may have different physical or chemical properties to suit the desired end use and/or different colours may be used for the different plastics.

In FIG. 4 the joins 446 and 447 between successive moulded portions are directly aligned across both concentric layers of the complete product. However those joins would preferably instead be offset from each other to improve the strength of the product.

Those skilled in the art of injection moulding understand that molten material flow paths can be induced so that directional characteristics to the strength of the moulded plastic product may be created. The multi-layering capability shown by the fourth embodiment of the invention allows different flow paths to be utilised for each layer in order to create a physically stronger product for example.

Figure 5:
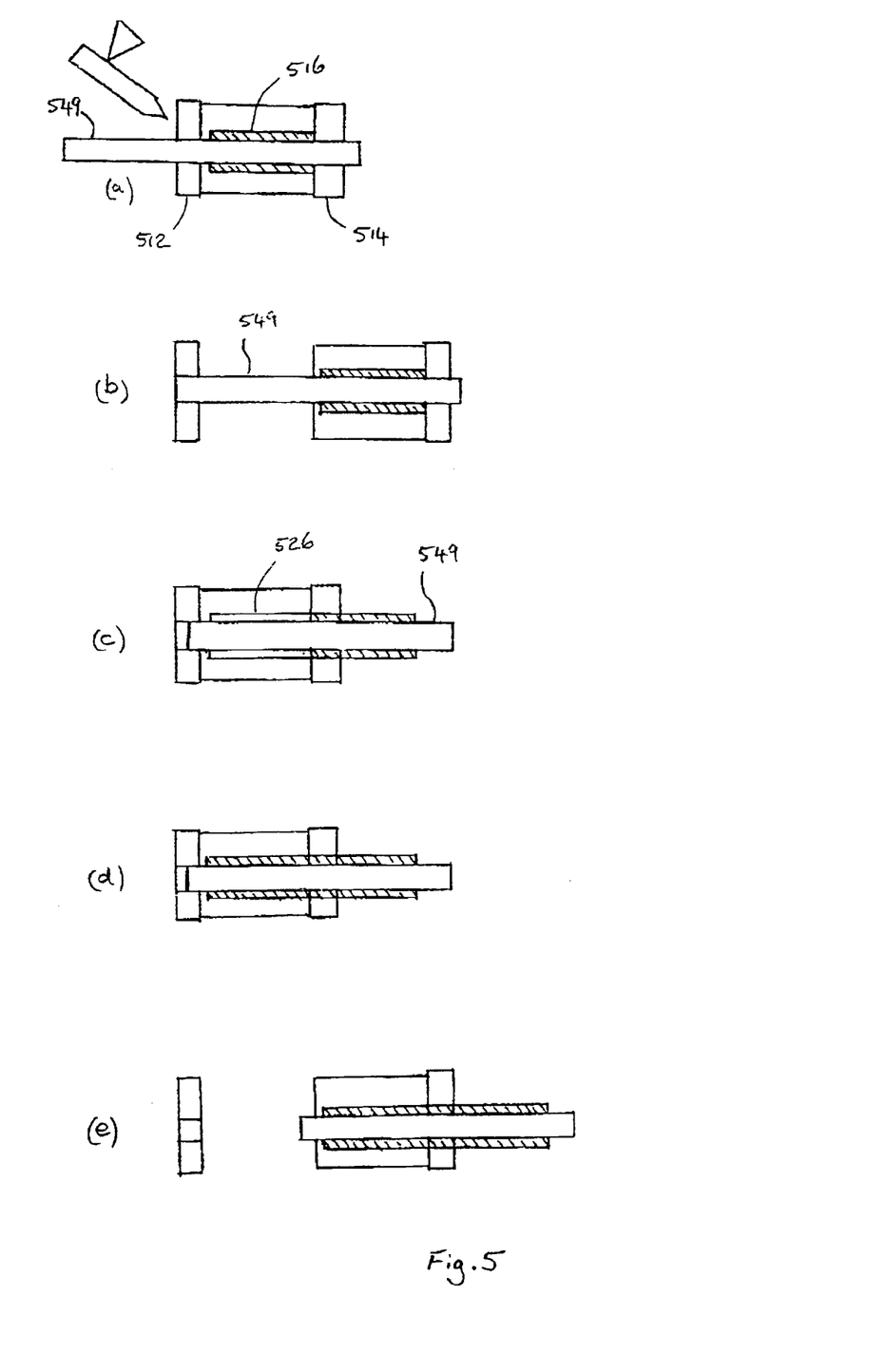
FIG. 5 diagrammatically illustrates the steps in a process according to a fifth embodiment of the present invention.

The fifth embodiment, which is illustrated in FIG. 5, is a technique for utilisation of the invention to produce a coating on existing products such as metal piping and other engineering profiles. The molten plastic is injected through the stationary platen 512 rather than through the core as described in relation to the previous examples. The plastic feeding hopper 506 and meter/pump 508 is moved from their previously-described position centrally of the stationary platen in order to allow the substrate member 549 to pass through the stationary platen 512 and the moving platen 514. The substrate member 549 is a pipe in FIG. 5 but may alternatively be another shaped section.

The mould cavity 516 is mounted on the moving platen 514, and the pipe 549 to be coated forms the interior wall of the mould cavity 526 so that the full length of the pipe is coated stepwise by successive cycles of the process.

FIGS. 6 to 10 show successive stages in a process according to a sixth embodiment of the present invention which is an adaptation of the above described second embodiment. The process is used to manufacture cylindrical pipe of an indefinite length. The cavity 616 formed by the moving platen 614 is cylindrical except for an annular step 630. The shaft-like core 620 on the stationary platen 612 is cylindrical and smooth. The effect of the annular step 630 in the mould is to form a moulded portion 640 which has, at its rear end 688, an axially extending collar portion 634 having its internal surface 635 smoothly continuous with that of the main body 646 of the moulded portion, and its cylindrical outer surface 636 stepped inwards from the line of the outer wall 645 of the main body 646 of the moulded portion.

Figure 6:
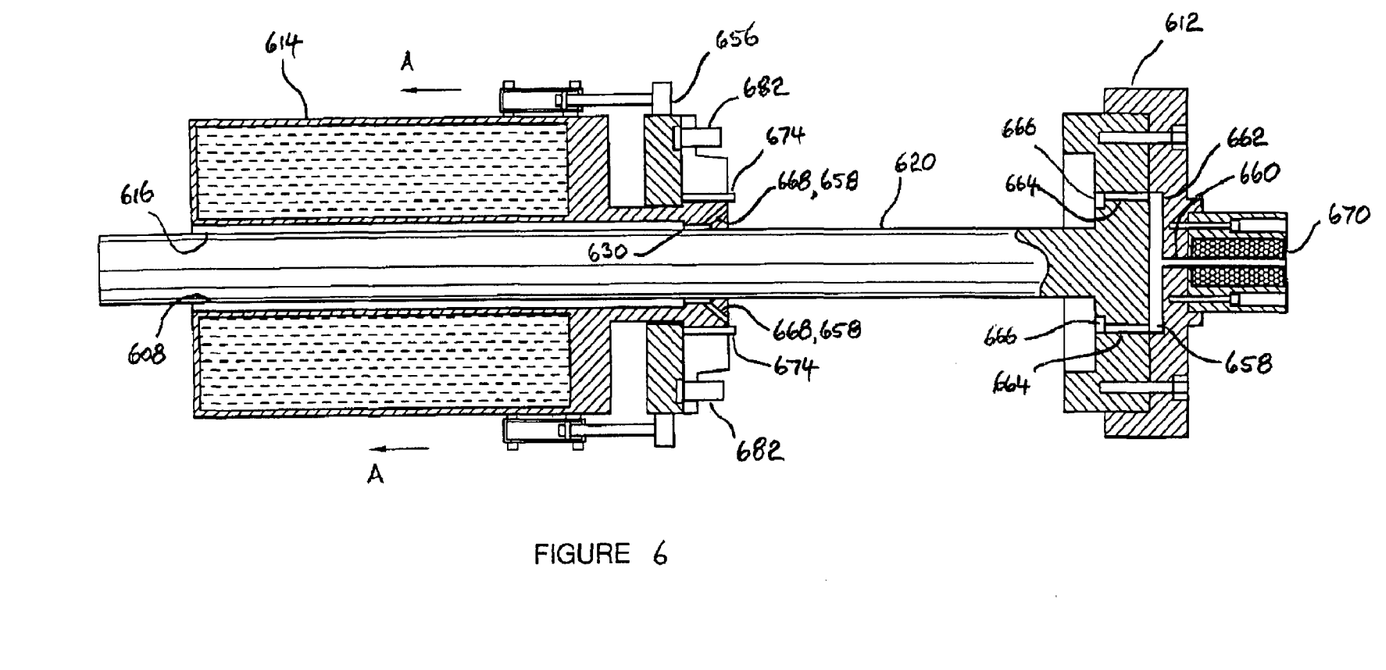
FIGS. 6 to 10 show successive stages in a process according to a sixth embodiment of the present invention.

In FIG. 6 the mould 608 is shown open prior to any injection of plastic. The moving platen 614 has moved to the left in the direction shown by the arrows "A". Attached to the moving platen is a mechanism 656 for clearing sprues from galleries 658 in the apparatus. Operation of the mechanism 656 will be described later in this specification.

Figure 7:
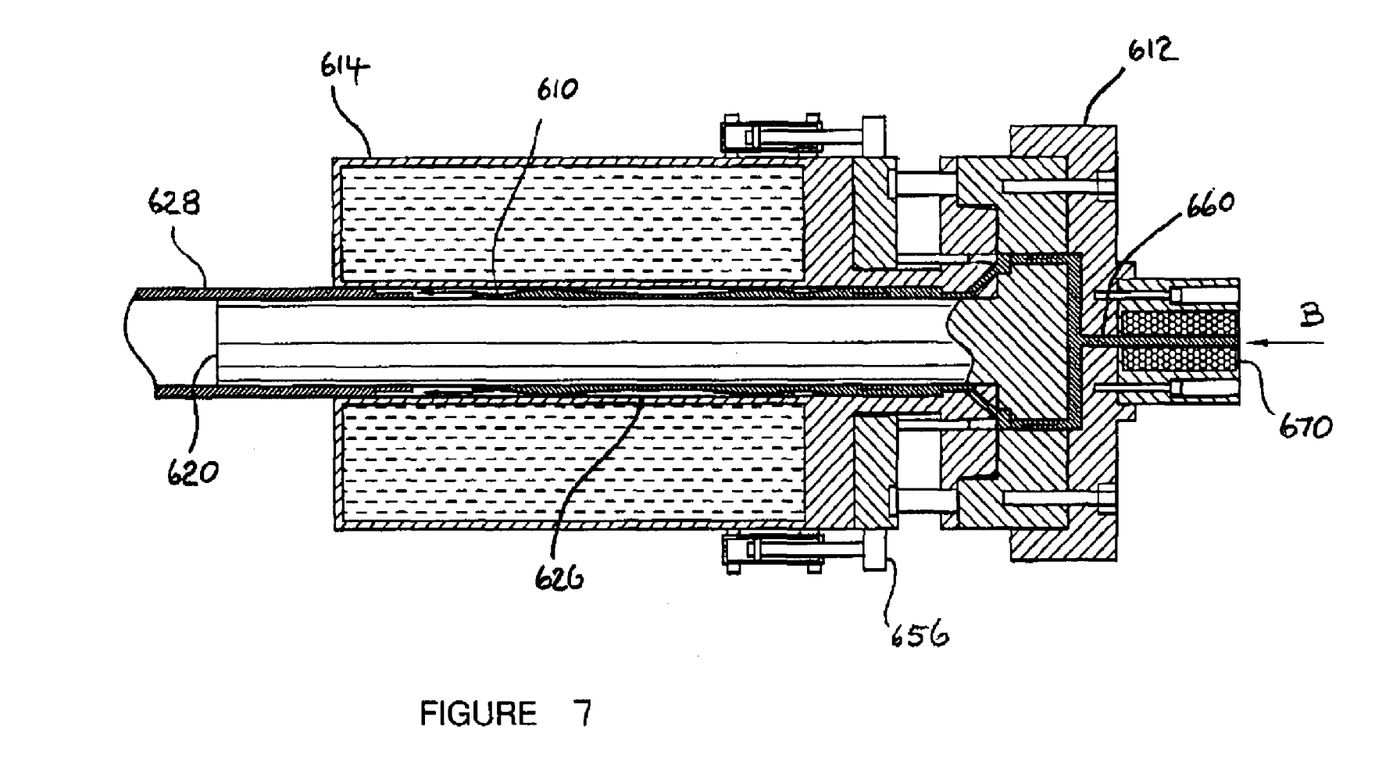

In FIG. 7 the moving platen 614 has moved to the right (in the direction opposite to arrows "A"), sliding along the core 620 of the stationary platen 612, to close the mould. A first moulded portion 628 from a previous cycle of the apparatus is held around and upon the left hand end of the core 620 and molten plastic 610 is being injected (arrow "B") through galleries 658 in the stationary platen and moving platen into the mould cavity 626. The galleries 658 comprise a main feed duct 660, radial gallery portion 662, two axial gallery portions 664, and two offset gallery portions 666, all in the stationary platen, and two angled gallery portions 668 in the moving platen. The main feed duct 660 is fed (see arrow "B") from a coupled feed line which may be thermally insulated or include a heater 670 to control the desired temperature of the melt.

Figure 8:
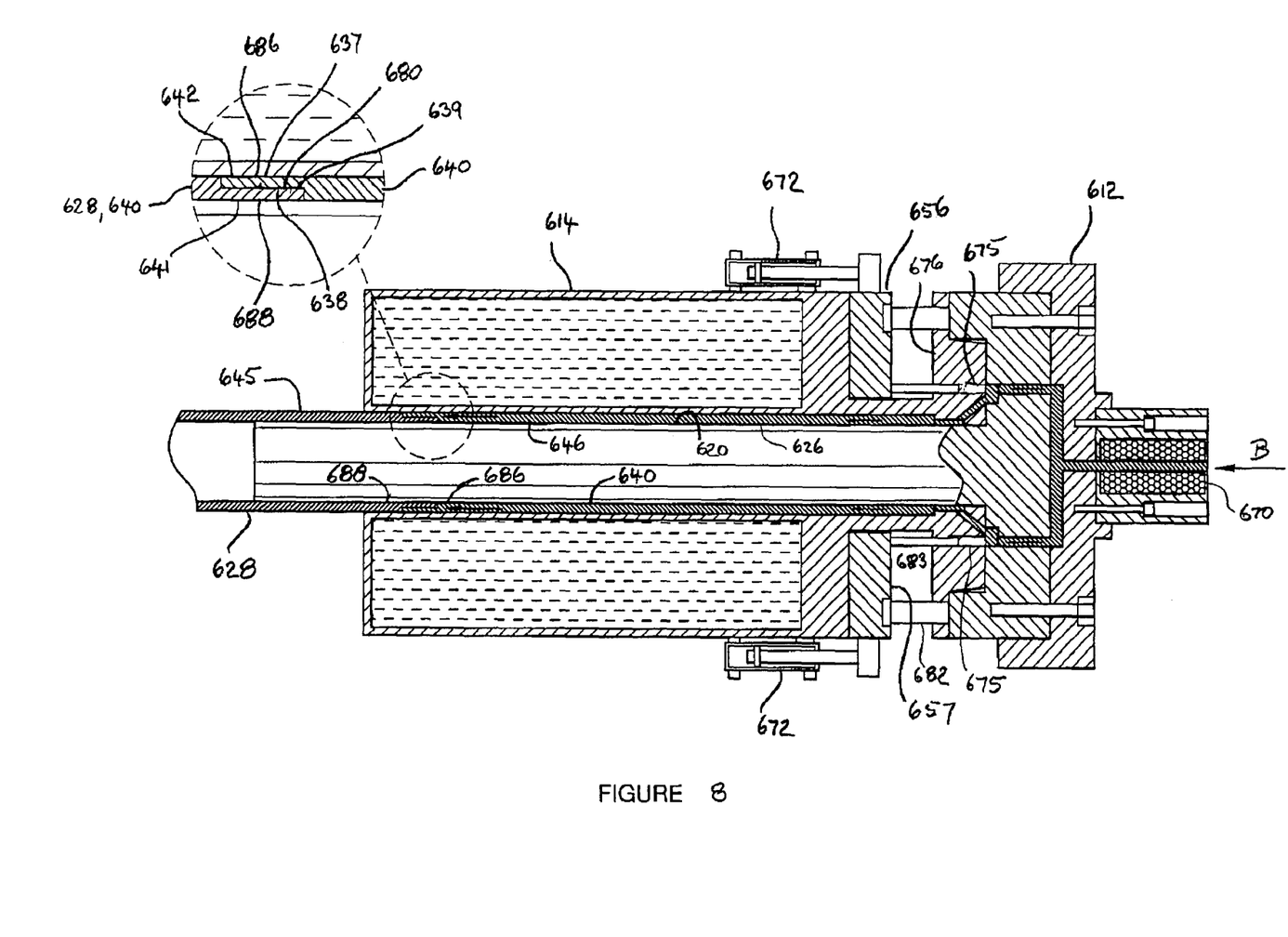

In FIG. 8 the plastic has completely filled the cavity 626 bounded by the moving platen 614, the core 620 and the previously moulded portion 628. The leading portion 686 of the plastic has flowed around the outside of the trailing portion 688 of the previously moulded portion 628. The plastic in the cavity 626 is then allowed to solidify. Its front end (or leading portion) 686 intimately bonds by welding to the rear end (or trailing portion) 688 of the previously moulded portion 628 to produce a lapped joint comprising an annular overlap 642 of the successive mouldings. This is shown in more detail in the circular enlargement of portion of the illustration. The front end 686 has formed thereon an axially extending sleeve 637, the internal face 638 of which is intimately bonded to the external surface 636 of the collar 634. The external surface 639 of the sleeve 637 is smoothly coextensive with the wall 646.

Figure 9:
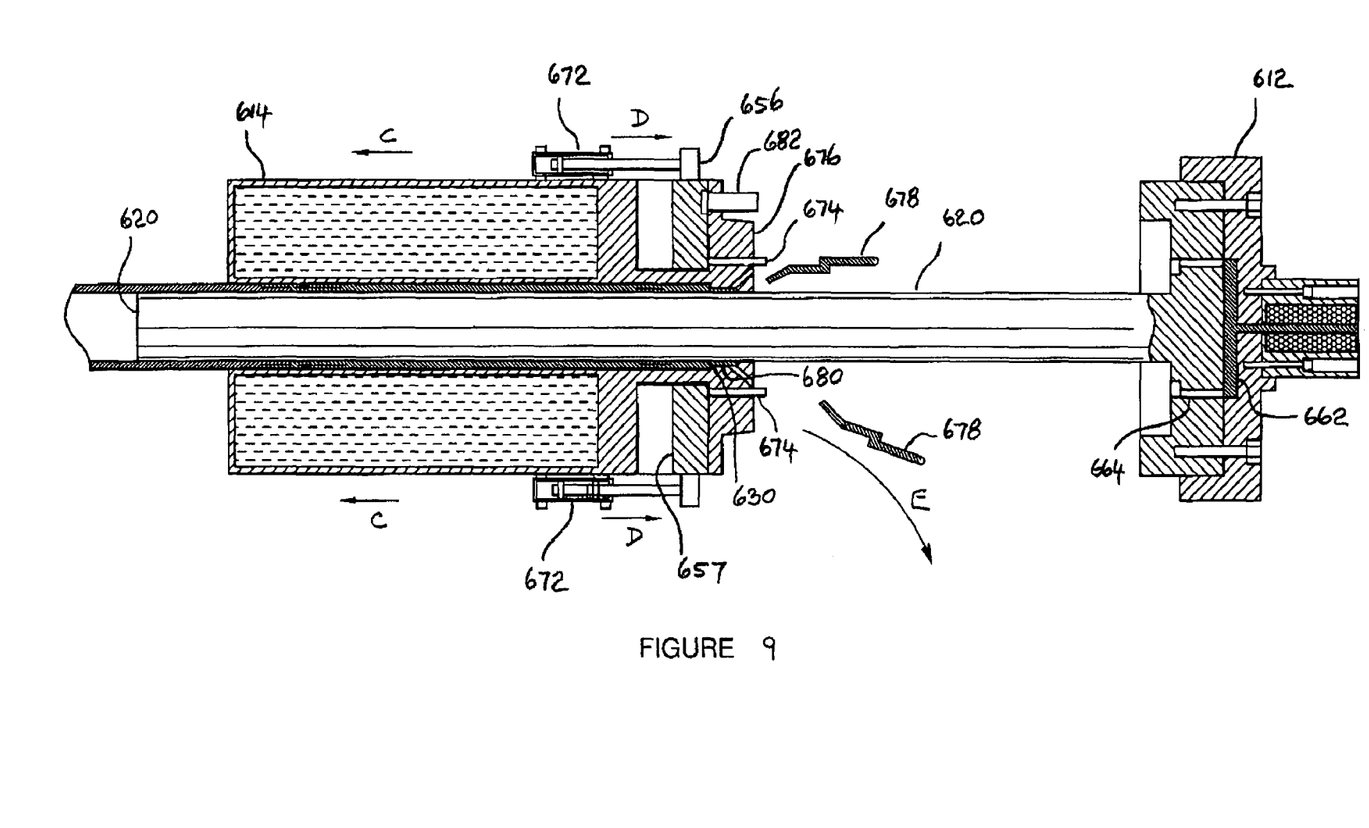

As shown in FIG. 9, for the next step in the process, the moving platen 614 is moved (as shown by arrows "C") to the left along the core. The freshly moulded plastic pulls out of the axial galleries 664, separating from the feed material at their junction with the radial gallery portion 662. As the platen moves to the left, its annular step 630 engages with the corresponding step 641 on the moulded portion 640 to move the moulded portion 640 to the left and thus strip the moulded portion 640 along the core. The step 630 has the opposite alignment to the step 230 in FIG. 2 and this provides for easier moving of the moulded portion by the platen 614. As the moulded material cools further, it shrinks onto the core 620.

During the process the rear end 688 may be preheated between the time it is moved and the time that the further portion of plastic 610 is injected into the mould 608. This provides for an improved bonding and improved mechanical strength at the joint.

As shown in FIG. 9, pneumatic cylinder actuators 672 on the moving platen are then activated to move the sprue clearing mechanism 656 to the right (as shown by arrows "D"). Two pins 674 on the sprue clearing mechanism are thereby pressed through bores 675 in an end plate 676 of the moving platen to eject the sprues 678 from the moving platen (as shown by arrow "E"). The sprues 678 separate from the moulded portion 640 at the stepped-in cylindrical face 680 of the moulded portion 640.

Figure 10:
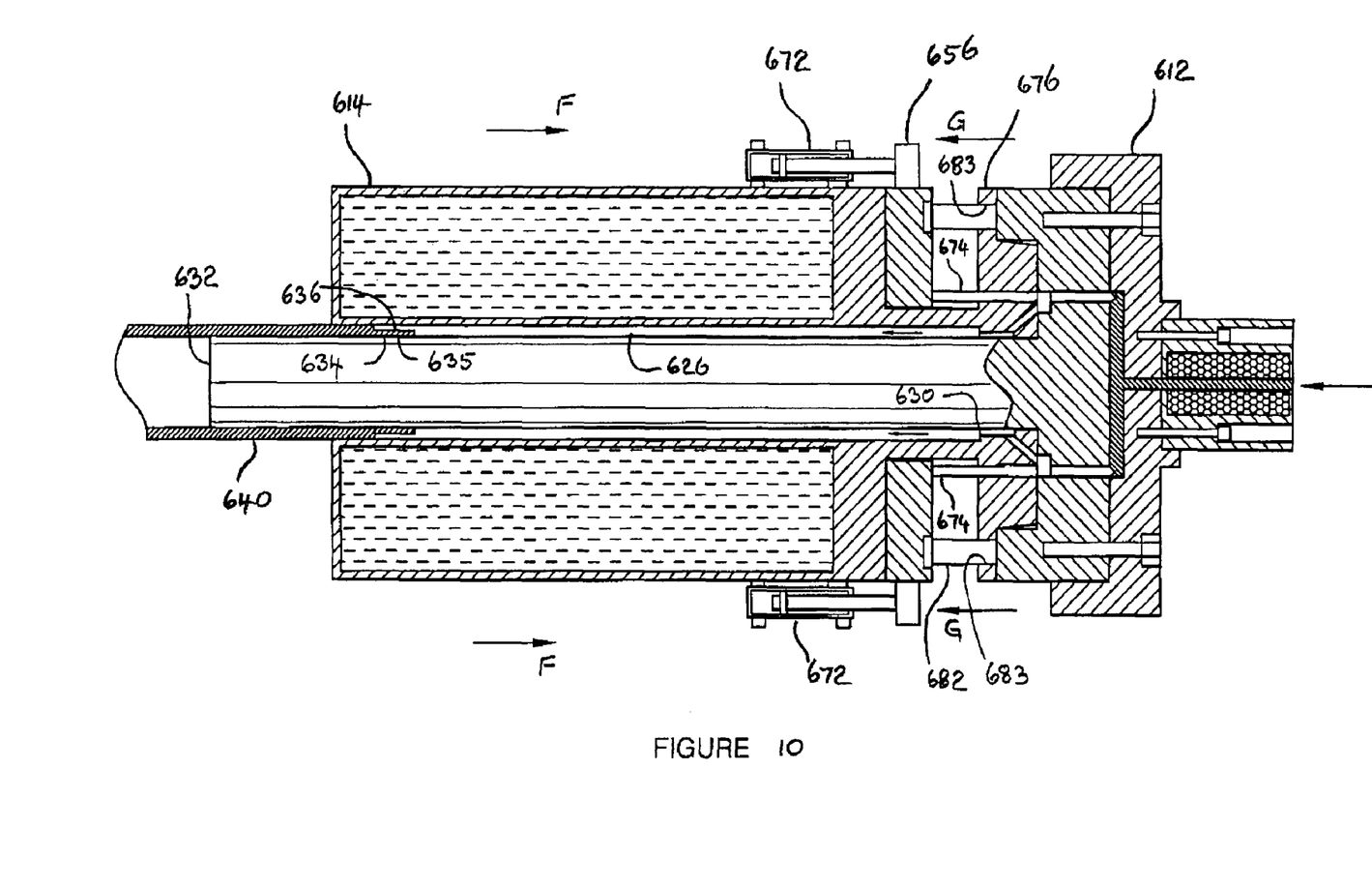

The moving platen 614 is then moved to the right as shown (by arrows "F") in FIG. 10, leaving the moulded section 640 of pipe attached to the free end 632 of the core. Forwardly directed studs 682 on the sprue clearing mechanism 656 slide in bores 683 through the main plate 657 of the sprue clearing mechanism. The studs 682 are the first part of the moving platen to contact the stationary platen and as they slide back into the bores 683, the main plate 657 is pressed away (see arrows "G") from the end of the moving platen.

An advantage of the present process is that it is not limited by the characteristics of the melt flow material to the degree that extrusion processes are so limited. Thus the process of the present invention is particularly adapted to mould products from recycled plastics materials which, by reason of their varied sources, may have substantially different theological properties at any given temperature in their melt phase. The present process is also particularly adapted to mould products from some plastics, such as PET (polyethylene terephthalate), which are not particularly suited for extrusion because their rheological properties are so greatly affected by small temperature variations, and such temperature variations would be extremely difficult to control in an extrusion process. The present process is also particularly adapted to mould products from fibre reinforced plastics; such as glass-filled nylon or other plastics having long fibre reinforcement embedded therein, which are not suited for extrusion processes. The present process is also adapted to mould products from chemical-setting polymers (such as 2-pack materials) which are notoriously difficult to extrude, and from plastics containing additives which provide UV resistance, fire retarding or antistatic properties.

Also, surface finish of an injection moulded product can be better than those for extruded product. Injection moulding can produce items having higher mechanical strengths. Gas assisted injection moulding systems can be used to improve surface finish and shrinkage.

Some embodiments of the present invention provide an efficient method of injection moulding pipes or profiles because the moulding is achieved in a linear direction and in communication with a moving platen.

By using two or more injection units simultaneously or sequentially, sections of piping or profiles may be made with different coloured bands circumferentially.

The through-platen injection moulding process described above may be modified such that the tooling can incorporate inserting, unscrewing, core pulling and tool splitting techniques. The present process is thus adaptable to create a continuous product which has a non-uniform cross section. This could be as simple as a patterned surface, but may also provide for the incorporation of substantial protrusions or indentations on the product at set intervals which may be set by the length of each incremental position in the stepwise process of the moulding.

Although the above-described embodiments are all described in relation to injection moulding of plastics, the process may also be applicable to the moulding of ferrous and non-ferrous metals, food products and ceramics.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The claims defining the invention are as follows:

1. A method of molding an object of indefinite length, said method comprising the steps of:
   (i) injecting a first portion of molten material into a mold comprising a stationary platen and a moving platen and allowing said material to solidify to form a first portion of solid material at a first position;
   (ii) moving said moving platen in a given direction relative to said stationary platen to open the mold and move said first portion of solid material in said given direction from said first position to a second position, whereby, in said second position, the first portion of solid material is in communication with the mold;
   (iii) moving said moving platen relative to said stationary platen in the direction opposite to said given direction to close the mold with said first portion of solid material in communication with the mold;
   (iv) injecting a further portion of molten material into the mold and allowing said further portion to solidify to form a further portion of solid material intimately bonded to said first portion of solid material;
   (v) moving said further portion of material to said second position whereby in said second position the further portion is in communication with the mold and remains bonded to said first portion; and
   (vi) repeating steps (iii) to (v) so as to form an object comprising said first portion and said further portions of material bonded together as a linear array of indefinite length.

2. A method according to claim 1 wherein the linear array passes through the moving platen.

3. A method according to claim 1 wherein the molding process is a single-cavity molding process.

4. A method according to claim 1 wherein the object being molded is tubular with its axis aligned with said given direction.

5. A method according to claim 1 wherein a leading portion of said further portion of molten material flows over a trailing portion of said first portion of solid material in said given direction and solidifies to form a bonded lapped joint between said first portion of solid material and said further portion of solid material.

6. A method according to claim 5 wherein said leading portion of the further portion of molten material flows to form a sleeve around said trailing portion of said first portion of solid material.

7. A method according to claim 1, wherein the molten material comprises polyethylene terephthalate.

8. A method according to claim 2 wherein the molding process is a single-cavity molding process.

9. A method according to claim 2 wherein the object being molded is tubular with its axis aligned with said given direction.

10. A method according to claim 2, wherein the molten material comprises polyethylene terephthalate.

11. A method according to claim 3, wherein the molten material comprises polyethylene terephthalate.

12. A method according to claim 4, wherein the molten material comprises polyethylene terephthalate.

13. A method according to claim 5, wherein the molten material comprises polyethylene terephthalate.

14. A method according to claim 6, wherein the molten material comprises polyethylene terephthalate.

15. A method according to claim 8, wherein the molten material comprises polyethylene terephthalate.

16. A method according to claim 9, wherein the molten material comprises polyethylene terephthalate.

17. A method according to claim 1, wherein the molten material is a fiber reinforced plastic.

18. A method according to claim 2, wherein the molten material is a fiber reinforced plastic.

19. A method according to claim 3, wherein the molten material is a fiber reinforced plastic.

20. A method according to claim 4, wherein the molten material is a fiber reinforced plastic.

21. A method according to claim 5, wherein the molten material is a fiber reinforced plastic.

22. A method according to claim 6, wherein the molten material is a fiber reinforced plastic.

23. A method according to claim 7, wherein the molten material is a fiber reinforced plastic.

24. A method according to claim 8, wherein the molten material is a fiber reinforced plastic.

25. A method according to claim 9, wherein the molten material is a fiber reinforced plastic.

26. A method according to claim 10, wherein the molten material is a fiber reinforced plastic.

27. A method according to claim 11, wherein the molten material is a fiber reinforced plastic.

28. A method according to claim 12, wherein the molten material is a fiber reinforced plastic.

29. A method according to claim 13, wherein the molten material is a fiber reinforced plastic.

30. A method according to claim 14, wherein the molten material is a fiber reinforced plastic.

31. A method according to claim 15, wherein the molten material is a fiber reinforced plastic.

32. A method according to claim 16, wherein the molten material is a fiber reinforced plastic.

* * * * *